United States Patent
Ono et al.

(10) Patent No.: US 7,392,878 B2
(45) Date of Patent: Jul. 1, 2008

(54) VEHICLE STEERING CONTROL SYSTEM

(75) Inventors: Hitoshi Ono, Ebina (JP); Youji Hoshino, Sagamihara (JP); Katsuhiro Suda, Hadano (JP); Yoshiki Yasuno, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 455 days.

(21) Appl. No.: 11/168,341

(22) Filed: Jun. 29, 2005

(65) Prior Publication Data

US 2006/0006020 A1 Jan. 12, 2006

(30) Foreign Application Priority Data

Jul. 6, 2004 (JP) .............................. 2004-199250

(51) Int. Cl.
*B62D 5/04* (2006.01)

(52) U.S. Cl. ....................................... 180/421; 180/446

(58) Field of Classification Search ................ 180/419, 180/421, 428, 446, 444
See application file for complete search history.

(56) References Cited

U.S. PATENT DOCUMENTS

| | | | | |
|---|---|---|---|---|
| 4,658,927 A | * | 4/1987 | Kanazawa | ................... 180/422 |
| 5,717,590 A | * | 2/1998 | Mihalko | ...................... 701/41 |
| 7,213,678 B2 | * | 5/2007 | Park | ........................... 180/444 |

| | | | | |
|---|---|---|---|---|
| 2003/0114970 A1 | | 6/2003 | Hara | |
| 2003/0221900 A1 | * | 12/2003 | Bolourchi et al. | ............ 180/446 |
| 2005/0251061 A1 | * | 11/2005 | Schuler et al. | ............... 600/545 |
| 2007/0256885 A1 | * | 11/2007 | Ammon et al. | ............. 180/417 |

FOREIGN PATENT DOCUMENTS

| | | |
|---|---|---|
| CN | 1425582 A | 6/2003 |
| DE | 19713567 A1 | 10/1998 |
| EP | 0853029 A2 | 7/1998 |
| EP | 1380491 A2 | 1/2004 |
| EP | 1415893 A2 | 5/2004 |
| JP | 2000-344120 A | 12/2000 |

* cited by examiner

*Primary Examiner*—Tony H. Winner
(74) *Attorney, Agent, or Firm*—Global IP Counselors, LLP (57) ABSTRACT

A vehicle steering control system is provided with a steering angle ratio varying mechanism, a variable power assisted steering mechanism and a steering angle ratio controller. The steering angle ratio varying mechanism varies the steering angle ratio, which is the ratio of the turning angle of the front wheels with respect to the steering angle of the steering wheel. The variable power assisted steering mechanism outputs an auxiliary steering force that supplements the steering force of the driver to the steering mechanism for turning the front wheels. The steering angle ratio controller increases the steering angle ratio in a steering angle range in the vicinity of the steering angle center point, and reduces the steering angle ratio in the steering angle range in the vicinity of the rack stopper position, regardless of the steering angular speed of the steering wheel.

10 Claims, 7 Drawing Sheets

VEHICLE STEERING CONTROL SYSTEM

CROSS-REFERENCE TO RELATED APPLICATIONS

This application claims priority to Japanese Patent Application No. 2004-199250. The entire disclosure of Japanese Patent Application No. 2004-199250 is hereby incorporated herein by reference.

BACKGROUND OF THE INVENTION

1. Field of the Invention

The present invention generally relates to a vehicle steering control system that have a steering angle ratio varying mechanism for varying the steering angle ratio, which is the ratio of the turning angle of the steering control wheels with respect to the steering angle of the steering wheel, and that also have a variable power assisted steering mechanism for outputting an auxiliary steering force that supplements the steering force of the driver.

2. Background Information

In conventional steering control systems for a vehicle, the following delay of the variable power assisted steering mechanism with respect to the change in the steering angle ratio is controlled by reducing the steering angle as the steering angular speed increases, ensuring the prevention of power assist loss. One example of such a conventional steering control system is disclosed in Japanese Laid-Open Patent Application No. 2000-344120.

In view of the above, it will be apparent to those skilled in the art from this disclosure that there exists a need for an improved vehicle steering control system. This invention addresses this need in the art as well as other needs, which will become apparent to those skilled in the art from this disclosure.

SUMMARY OF THE INVENTION

It has been discovered that the driver sometimes feel uncomfortable when using a vehicle equipped with the above-described conventional technology. In particular, the driver may be made to feel uncomfortable using the above-described conventional technology because the maximum rotation angle of the steering wheel (lock-to-lock) changes when the steering angular speed is different even if the vehicle speed is the same.

The present invention was contrived in view of the foregoing problem. One object of the present invention is to provide a steering control system for a vehicle that can prevent power assist loss caused by the tracking delay of the variable power assisted steering mechanism, and prevent an offset of the steering wheel maximum rotation angle of the steering wheel produced by a difference in the steering angular speed.

In order to achieve the above mentioned objects and other objects of the present invention, a vehicle steering control system is provided that basically comprises a steering angle ratio varying mechanism, a variable power assisted steering mechanism, a steering angle detection device and a steering angle ratio controller. The steering angle ratio varying mechanism is configured and arranged to vary a steering angle ratio of a manually operated steering mechanism. The variable power assisted steering mechanism is configured and arranged to output an auxiliary steering force to the manually operated steering mechanism that supplements a driver steering force for turning steerable road wheels. The steering angle detection device is configured and arranged to detect a steering angle of the manually operated steering mechanism. The steering angle ratio controller is configured and arranged to control the steering angle ratio varying mechanism to increase the steering angle ratio in a center steering angle range in a vicinity of a center steering angle position, and to reduce the steering angle ratio in a steering angle range in a vicinity of a maximum steering limit position, regardless of the steering angular speed of the manually operated steering mechanism.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
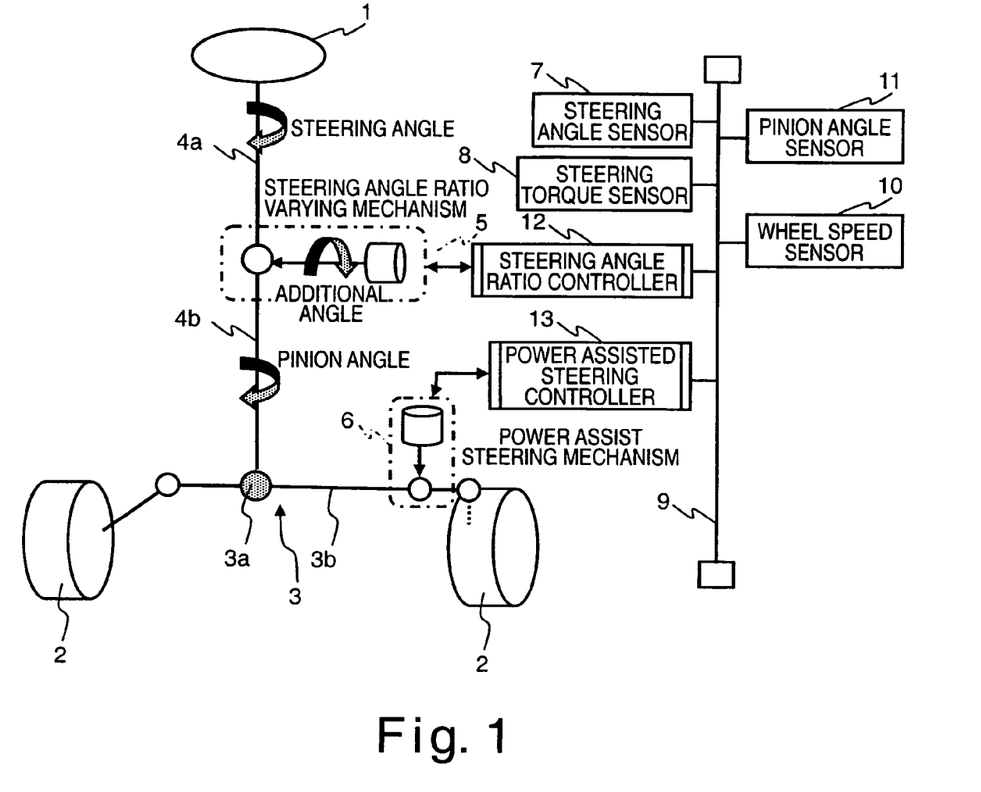
FIG. 1 is an overall schematic block diagram of a vehicle steering device in accordance with a first embodiment of the present invention.

Referring initially to FIG. 1, a vehicle steering device is schematically illustrated that is equipped a vehicle steering control system in accordance with a first embodiment of the present invention. The vehicle steering device basically includes a steering wheel (manually operated steering mechanism) 1, a pair of front wheels (steering control wheels) 2, a steering mechanism 3, a steering column (i.e., an upper column shaft 4a and a lower column shaft 4b), a steering angle ratio varying mechanism 5 and a variable power assisted steering mechanism (steering force auxiliary mechanism) 6. The steering wheel 1 is operatively coupled to the front wheels (steering control wheels) 2 via the upper and lower column shafts 4a and 4b, the steering angle ratio varying mechanism 5 and the variable power assisted steering mechanism 6. The steering angle ratio varying mechanism 5 is operatively disposed between the upper column shaft 4a and the lower column shaft 4b for linking the steering wheel 1 to a steering gear 3a of the steering mechanism 3 that turns the front wheels (steerable road wheels) 2. The variable power assisted steering mechanism 6 is disposed in a rack shaft 3b of the steering mechanism 3.

A steering angle sensor (steering angle detection device) 7 is disposed in the upper column shaft 4a. The steering angle sensor 7 is configured and arranged to detect the steering wheel steering angle. A steering torque sensor 8 is disposed in the upper column shaft 4a. The steering torque sensor 8 is configured and arranged to detect the steering torque. The detected steering wheel steering angle signal and the detected steering torque signal are output to a communication harness 9. A wheel speed sensor 10 is configured and arranged to detect vehicle speed and output a vehicle speed signal to the communication harness 9. A pinion angle sensor 11 is configured and arranged to detect a pinion angle and output a pinion angle signal to the communication harness 9.

The steering angle ratio varying mechanism 5 varies the steering angle ratio, which is the ratio of the turning or steered angle of the steerable front wheels 2 with respect to the steering wheel steering angle, in accordance with the electric control current from a steering angle ratio controller 12. In the illustrated embodiment, the pinion angle is used as a representative value for the turning angle of the front wheels 2.

The variable power assisted steering mechanism 6 outputs an assist torque (auxiliary steering force) for supplementing the steering force of the driver to the rack shaft 3b of the steering mechanism 3 in accordance with the electric control current from the power assisted steering controller 13.

The controllers 12 and 13 can be a single microcomputer with an input/output interface (I/O), storage devices such as a ROM (Read Only Memory) device and a RAM (Random Access Memory) device, and a central processing unit (CPU) or a pair of separate microcomputers each with an input/output interface (I/O), storage devices such as a ROM (Read Only Memory) device and a RAM (Random Access Memory) device, and a central processing unit (CPU) as needed and/or desired. The microcomputer of the steering angle ratio controller 12 is programmed to control the steering angle ratio varying mechanism 5, while the power assisted steering controller 13 is programmed to control the variable power assisted steering mechanism 6. In other words, the CPU for each of the controllers 12 and 13 is responsible for carrying the variable steering angle ratio control program and the variable power assisted steering control program, respectively, stored in memories and is capable of performing necessary arithmetic and logic operations. The input/output interface (I/O) for each of the controllers 12 and 13 receives input information from various engine/vehicle sensors, for example, sensors 7, 8, 10 and 11. The internal RAM for each of the controllers 12 and 13 stores statuses of operational flags and various control data. The internal ROM for each of the controllers 12 and 13 stores the preset data for various operations. It will be apparent to those skilled in the art from this disclosure that the precise structure and algorithms for the controllers 12 and 13 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The steering angle ratio controller 12 includes a steering angle ratio setting section and a variable power assisted steering drive section. The steering angle ratio setting section of the steering angle ratio controller 12 is configured or programmed to set a target steering angle. The variable power assisted drive section is configured or programmed to control the steering angle ratio varying mechanism to obtain the target steering angle ratio.

The steering angle ratio controller 12 also computes the target pinion angle for obtaining the target steering angle on the basis of the steering wheel steering angle signal from the steering angle sensor 7 and the vehicle speed signal from the wheel speed sensor 10. The target steering angle ratio is set based on the relationship between the pinion angle and the steering angle set in advance in accordance with the vehicle speed, as shown in FIG. 3, for example.

Figure 3:
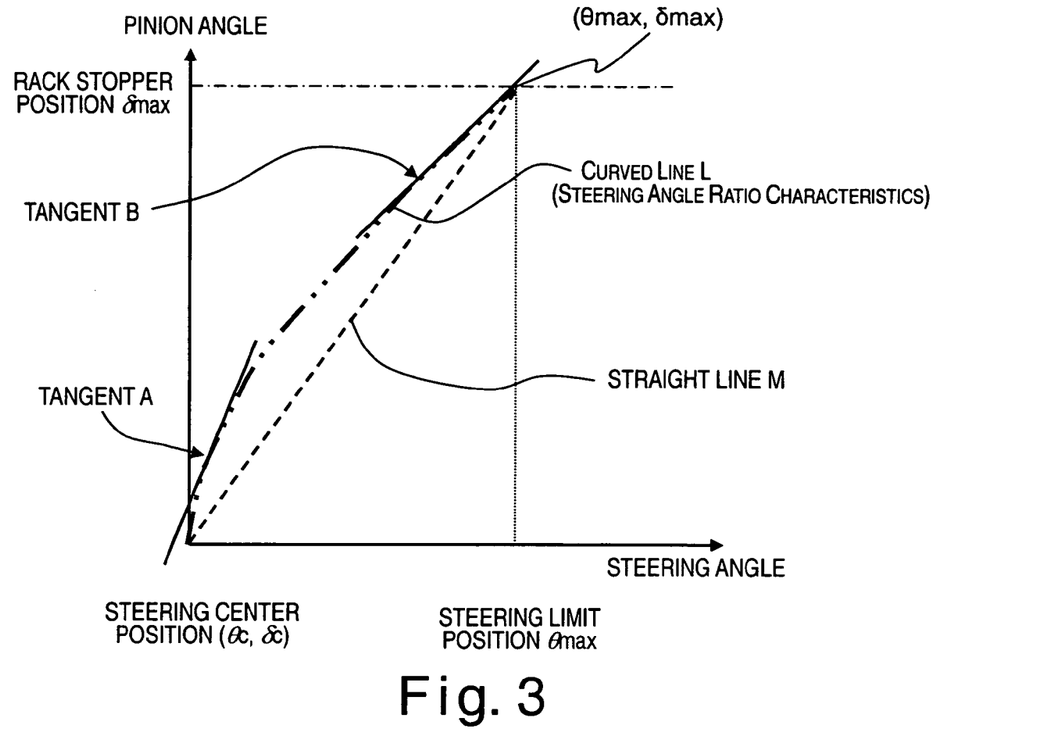
FIG. 3 is a diagram showing the relationship between the steering angle and the pinion angle of the first embodiment of the present invention.

In FIG. 3, a curved line L represents the steering angle ratio characteristic of the vehicle steering device. The curved line L connects the steering center point ($\theta c$, $\delta c$) and the intersection ($\theta max$, $\delta max$) between the rack stopper position $\delta max$ and the steering limit position $\theta max$. The curved line L is set so that the slope of the tangent A showing the steering angle ratio is greater than the slope of the straight line M connecting the above-described two points in the steering angle area in the vicinity of the steering center point, and so that the slope of the tangent B is less than the slope of the straight line M connecting the above-described two points in the steering angle area in the vicinity of the intersection between the rack stopper position $\delta max$ and the steering limit position $\theta max$. The curved line L is designed so that the slope of the tangent gradually becomes smaller as the steering angle increases. The curved line L is set so that the slope of the tangent A in the steering angle area in the vicinity of the steering center point increases as the vehicle speed is reduced (refer to FIG. 9).

Figure 4:
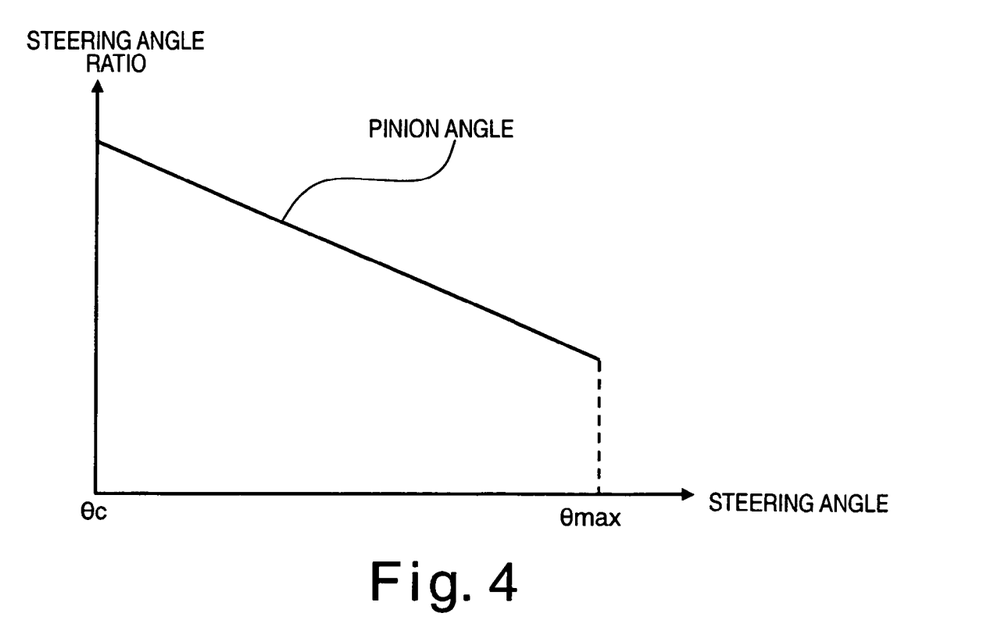
FIG. 4 is a steering angle ratio map used by the steering angle ratio controller of the vehicle steering device of the first embodiment of the present invention.

FIG. 4 is a steering angle ratio map obtained by substituting the data in FIG. 3 into the relationship between the steering angle and the steering angle ratio. The steering angle ratio controller 12 references the steering angle ratio map set in advance in accordance with the vehicle speed and calculates the target pinion angle from the steering angle signal from the steering angle sensor 7.

The steering angle ratio controller 12 outputs an electric control current for achieving the target steering angle to the steering angle ratio varying mechanism 5 on the basis of the deviation between the target pinion angle and the pinion angle signal from the pinion angle sensor 11. This process by the steering angle ratio controller 12 corresponds to the variable power assisted drive section of the steering angle ratio controller 12.

The power assisted steering controller 13 sets the target assist torque on the basis of the steering torque signal from the steering torque sensor 8. Electric control current based on the target assist torque thus set and the steering torque signal from the steering torque sensor 8 is output to the variable power assisted steering mechanism 6.

In the present invention, as explained below in more detail, since the steering angle ratio is reduced regardless of the steering angular speed in the vicinity of the steering limit (lock) position, in which the power assist response characteristics of the variable power assisted steering mechanism 6 are low, the road wheel turning angular speed can be reduced and the tracking delay of the variable power assisted steering mechanism 6 can be prevented. Conversely, since the steering angle ratio is increased regardless of the steering angular speed in the vicinity of the center steering angle position, in which good power assist response characteristics exist, the road wheel turning angular speed can be increased and the reduced turning amount offset in the steering limit position. Accordingly, power assist loss caused by a tracking delay in the variable power assisted steering mechanism 6 can be prevented, and an offset of the steering wheel maximum rotation angle produced by a difference in the steering angular speed can also be prevented.

Steering Angle Ratio Setting Control Routine

Figure 2:
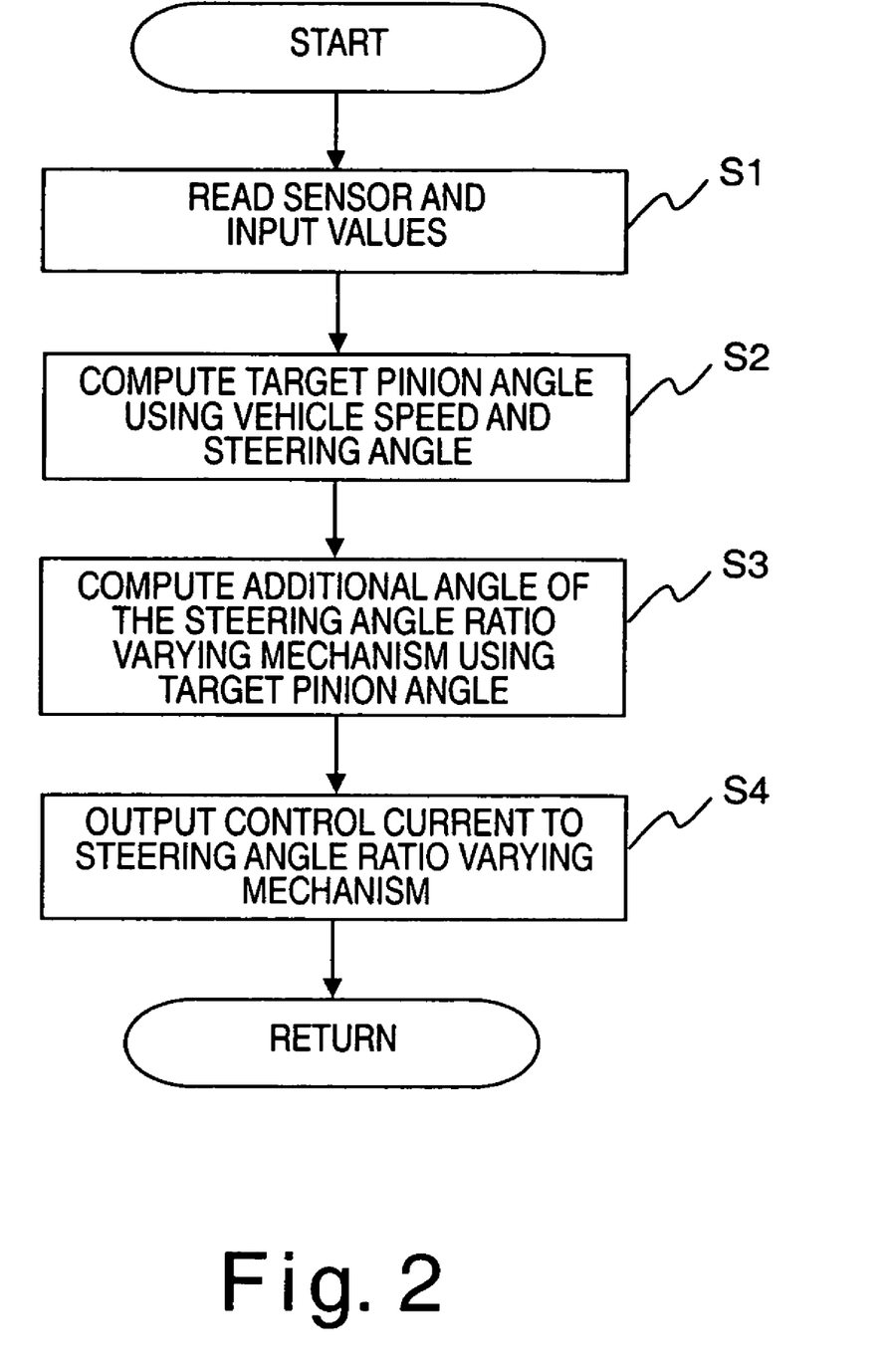
FIG. 2 is a flowchart showing the flow of the steering angle ratio setting control routine that is executed in the steering angle ratio controller of the first embodiment of the present invention.

FIG. 2 is a flowchart showing the flow of the steering angle ratio setting control routine that is executed in the steering angle ratio controller 12, and the steps are described below.

In step S1, the steering angle ratio controller 12 is configured to read the steering angle signal detected from the steering angle sensor 7 and the vehicle speed signal detected from the wheel speed sensor 10, and then advances to step S2.

In step S2, the steering angle ratio controller 12 is configured to read the steering angle ratio map (FIG. 4) set in advance for each vehicle speed from the vehicle signal read in step S1, and compute the target pinion angle on the basis of the target steering angle ratio map and the steering wheel steering angle signal read in step S1. Next, the steering angle ratio controller 12 advances to step S3.

In step S3, the steering angle ratio controller 12 is configured to calculate the additional angle of the steering angle ratio varying mechanism 5 from the target pinion angle computed in step S2. As used herein, the term "additional angle" refers to the addition portion of the pinion angle that the steering angle ratio varying mechanism 5 adds to the change amount of the pinion angle generated by the steering angle input of the driver, in order to obtain the target pinion angle. The steering angle ratio controller 12 then advances to step S4.

In step S4, the steering angle ratio controller 12 is configured to output the electric control current for obtaining the target pinion angle to the steering angle ratio varying mechanism 5. The steering angle ratio controller 12 then returns to the beginning of the control routine.

Now the drawbacks of conventional steering angle ratio variation control based on steering angular speed will be discussed. Conventionally, the reduction of lock-to-lock produced by the steering angle ratio varying mechanism requires that the variable power assisted steering mechanism be strengthened in order to assure the increased portion of the pinion angular speed produced by the steering angle ratio varying mechanism because the steering speed of the driver is fixed regardless of the existence of the mechanism. However, strengthening the variable power assisted steering mechanism produced a tradeoff in the mountability of the pump (hydraulic type), the motor (electric type), and/or other components, poorer fuel economy, and other undesirable effects.

Figure 5:
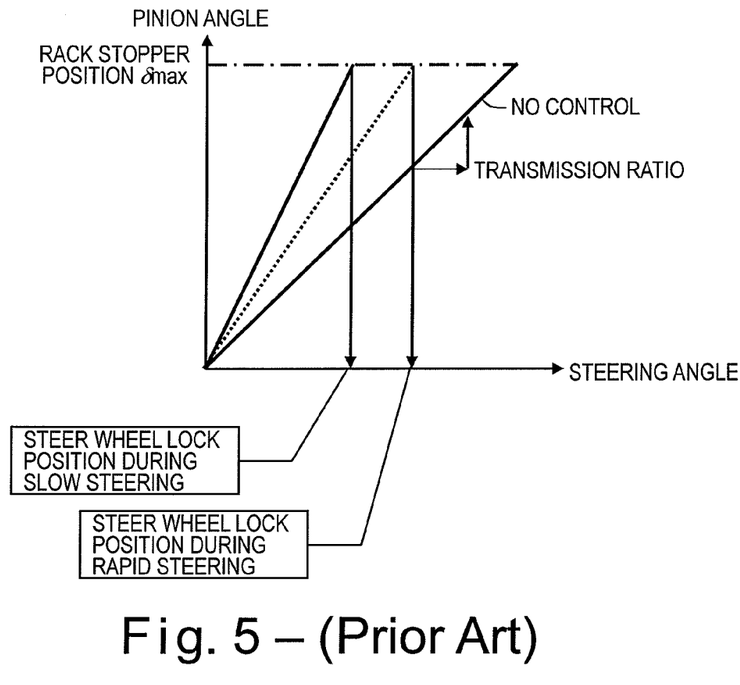
FIG. 5 is a diagram showing variable steering angle control in accordance with conventional steering angular speed.

In the technique cited in Japanese Laid-Open Patent Application No. 2000-344120, when the steering angular speed is high, the strengthening of the variable power assisted steering mechanism is kept to a minimum by using a method in which the steering angle ratio that is set in accordance with the vehicle speed is corrected in the ratio-reducing direction, as shown in FIG. 5, but there is a drawback in that lock-to-lock varies depending on the steering angular speed.

Figure 6:
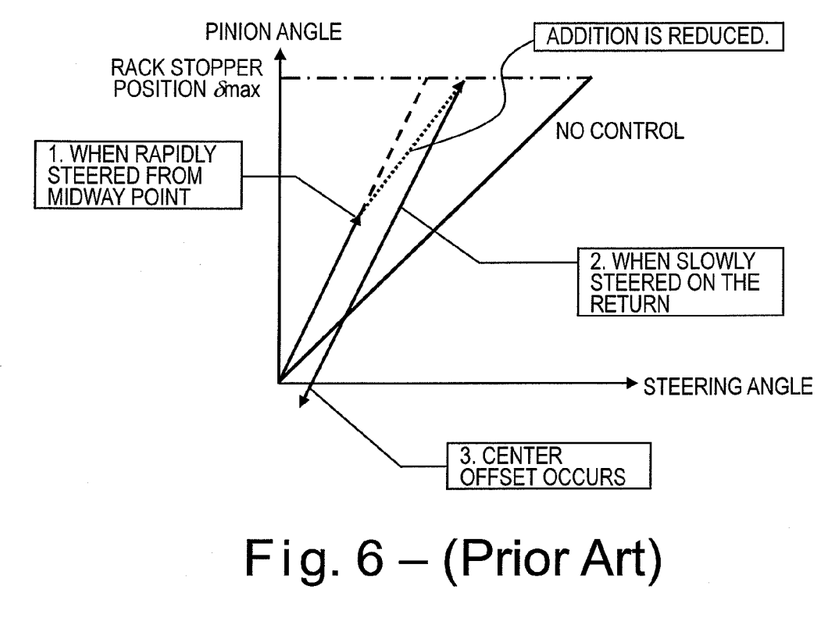
FIG. 6 is a diagram showing the drawbacks of conventional control.

Furthermore, in the above-described conventional technology, since the configuration corrects the steering angle ratio during steering (steering wheel center position), the steering angle ratio must be returned to the initial setting, or complicated control must be performed in order to eliminate center offset when the driver changes the steering angular speed because when the steering speed is increased (item 1) during the turning of the steering wheel and is then slowly steered on the return (item 2), center offset occurs (item 3), as shown in FIG. 6.

Now the steering angle ratio setting action corresponding to the steering angle alone will be discussed. In the illustrated embodiment, since the variable power assisted steering mechanism 6 has high power assist response characteristics in the area where the pinion angle is small, the steering angle ratio is set so that the additional turning angular speed produced by the steering angle ratio varying mechanism 5 is increased. In other words, the steering angle ratio (slope of curved line) is increased, as shown in part (b) of FIG. 7 in the steering range in the vicinity of the center steering angle position.

In the area where the pinion angle is large, that is to say, when the front wheels 2 are in the vicinity of the rack stopper, the variable power assisted steering mechanism 6 has reduced power assist response characteristics which depend on the geometry of the suspension, and the link efficiency worsens. Therefore, the steering angle ratio is made substantially the same as the value determined by the suspension configuration so that the additional turning angular speed produced by the steering angle ratio varying mechanism 5 is low or zero.

Figure 7:
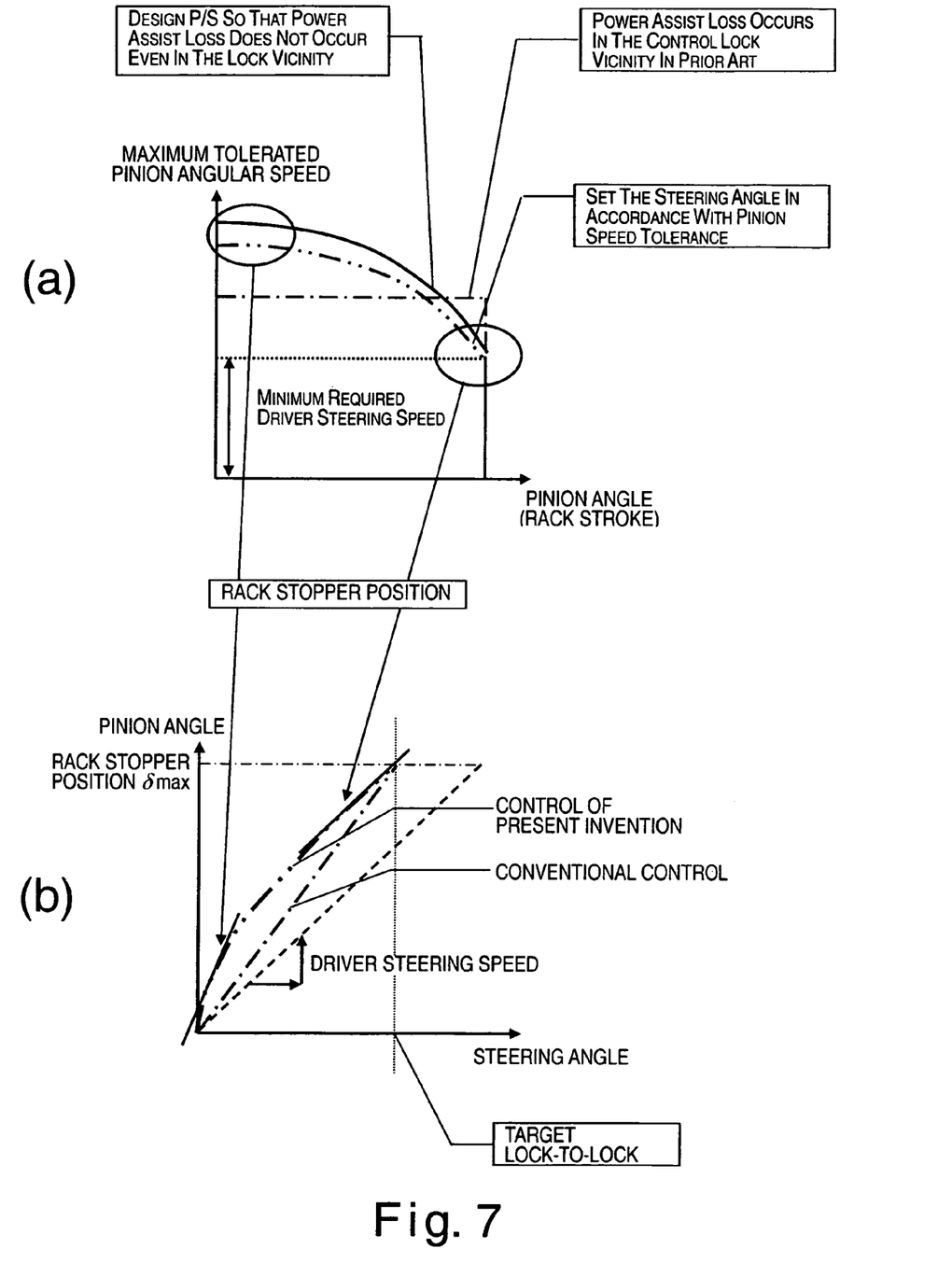
FIG. 7 is a diagram showing a setting method for determining the additional turning angular speed that is executed in the steering angle ratio controller of the first embodiment of the present invention.

The specific value of the additional turning angular speed at this time is set to obtain the target lock-to-lock in accordance with the maximum tolerable pinion angular speed determined by the steering angular speed that is produced by a minimum driver required steering speed and by the capacity of the variable power assisted steering mechanism 6, as shown in part (a) of FIG. 7. That is to say, the additional turning angular speed is set to be equal to or less than the value found by subtracting the minimum driver required steering speed (i.e., a required steering angular speed needed for maintaining a desired level of steering input from the driver to the wheels 2) from the maximum tolerable pinion angular speed.

In conventional control in which the steering angle is not allowed to changed in accordance with the steering angular speed, the pinion angular speed exceeds the maximum tolerable pinion angular speed, and power assist loss occurs in the vicinity of the lock position, but since pinion angular speed does not exceed the maximum tolerable pinion angular speed because the additional turning angular speed is set in accordance with the maximum tolerable pinion angular speed in the illustrated embodiment, the occurrence of power assist loss is prevented in the vicinity of the lock position.

In contrast to the technology cited in Japanese Laid-Open Patent Application No. 2000-344120 in which power assist loss of the variable power assisted steering mechanism is prevented by changing the steering angle ratio in accordance with the steering angular speed, in the illustrated embodiment of the present invention, the occurrence of center offset is prevented because the steering angle ratio does not change with the variance in the steering angular speed.

Figure 8:
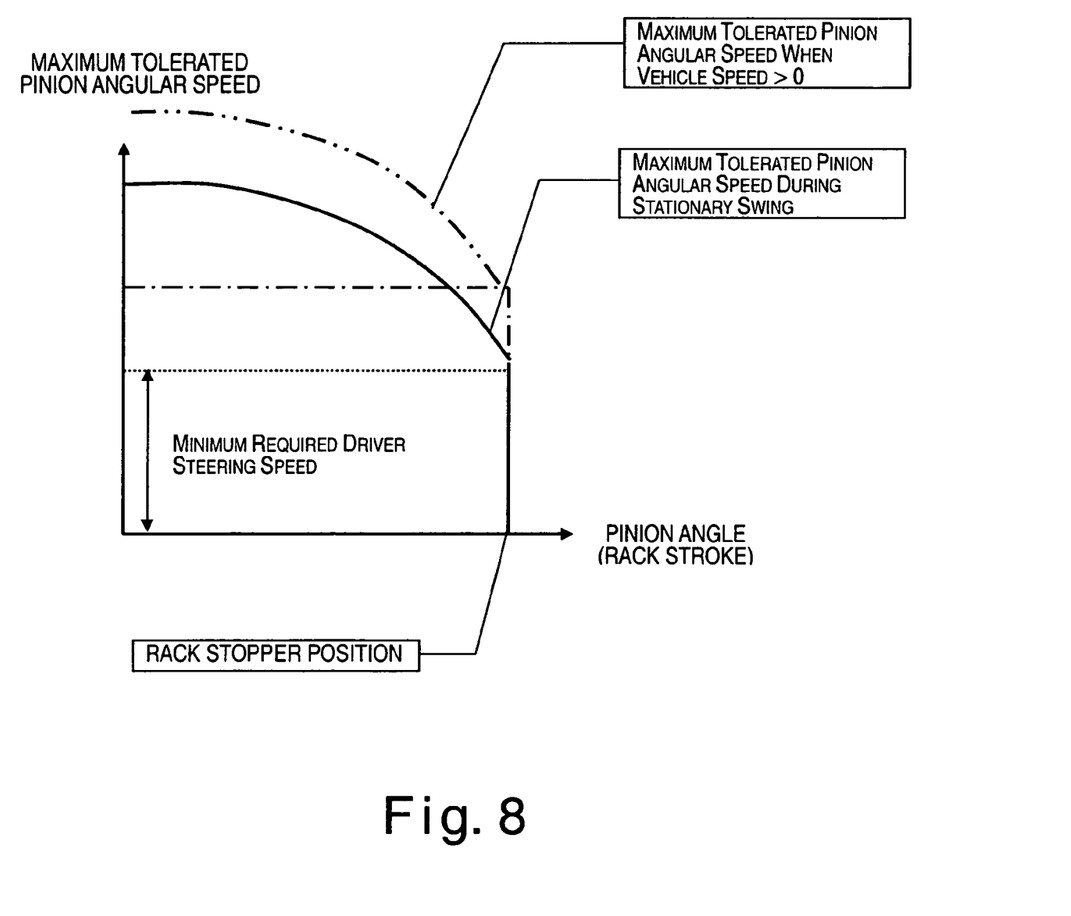
FIG. 8 is a diagram showing the maximum tolerable pinion angular speed when the vehicle is stationary and when the vehicle is traveling.

Now the steering angle ratio setting action while running will be discussed. The load when turning varies considerably between turning the front wheels 2 with a stationary swing at a vehicle speed of 0 and turning the front wheels 2 with a slip angle at a vehicle speed of greater than 0, as shown in FIG. 8.

More specifically, the load when the vehicle speed is greater than 0 is ordinarily less than the load of a stationary swing (vehicle speed is 0).

Accordingly, since good power assist response characteristics exist if the vehicle speed is greater than 0, even in the vicinity of the lock position, the additional turning angular speed can be made equal to or greater than 0, as shown in the diagram.

Figure 9:
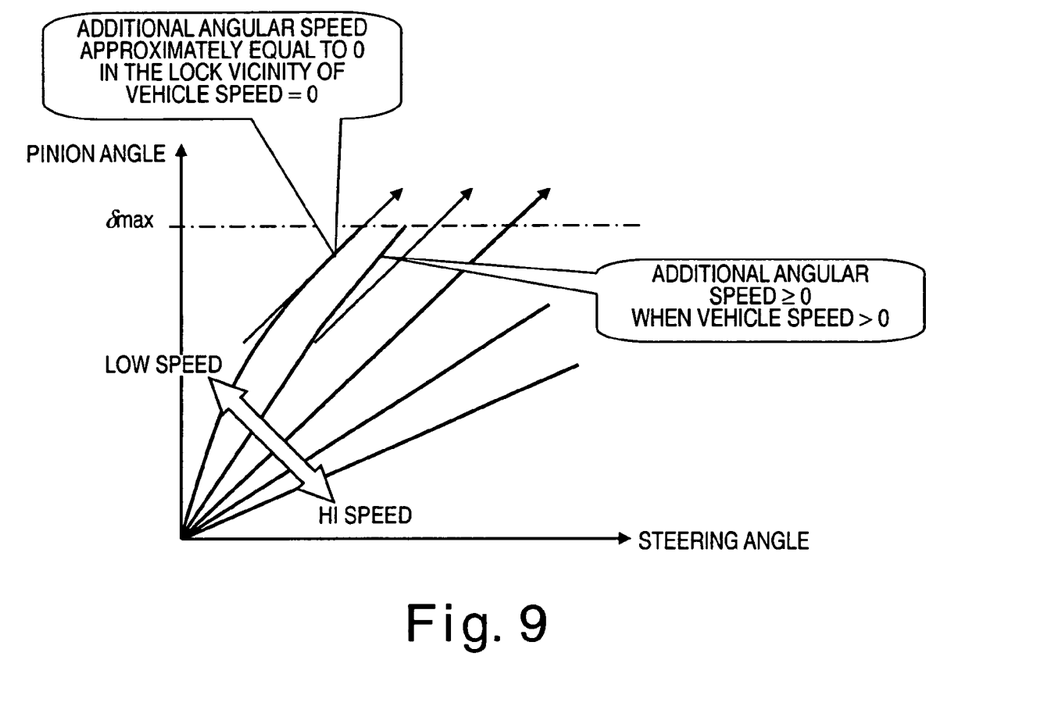
FIG. 9 is a diagram showing the additional turning angular speed setting routine or map for setting the additional turning angular speed in accordance with the vehicle speed that is executed in the steering angle ratio controller of the first embodiment of the present invention.

Now the steering angle ratio setting action when the vehicle is stationary will be discussed. Conversely, when stationary, the steering angle is selected with the maximum slope of the tangent in the steering angle area in the vicinity of the steering center point, as shown in FIG. 9 (steering response is at the lowest speed).

Figure 10:
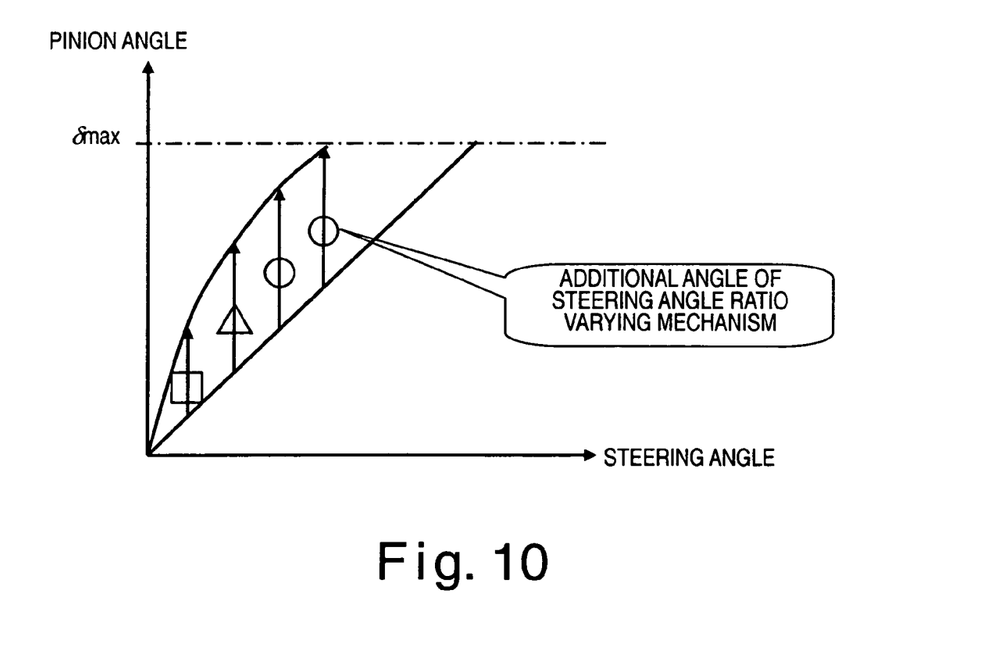
FIG. 10 is a diagram showing the additional turning angular speed setting routine or map for setting the additional turning angular speed in accordance with the vehicle speed that is executed in the steering angle ratio controller when the vehicle is stationary.

During a stationary swing, since the load of the variable power assisted steering mechanism 6 is at its maximum, and the maximum tolerable pinion angular speed is reduced in the vicinity of the lock position, the additional angle is maximum in the vicinity of the steering center point at which good power assist response characteristics exist in the variable power assisted steering mechanism 6. Since the amount of increase in the additional angle in the vicinity of the lock position can be made substantially zero, the target pinion angle can be achieved without placing an excessive load on the variable power assisted steering mechanism 6, as shown in FIG. 10.

The effects are described next. The effects listed below can be obtained with the steering control system for a vehicle of illustrated embodiment.

The steering angle ratio controller 12 increases the steering angle ratio in the steering angle area in the vicinity of the steering center position, and reduces the steering angle ratio in the steering angle area in the vicinity of the rack stopper position, regardless of the steering angular speed of the steering wheel 1, thereby preventing power assist loss that is caused by tracking delay of the variable power assisted steering mechanism 6.

Displacement of the maximum steering angle of the steering wheel 1 caused by a difference in the steering angle speed can be prevented because the steering angle ratio controller 12 has a steering angle ratio setting section configured and arranged to set a target steering angle ratio that increases an additional turning angular speed, which is an additional amount of turning angular speed produced by the steering angle ratio varying mechanism 5 with respect to the steering angular speed, and that reduces the additional turning angular speed in the steering range in the vicinity of the steering limit position. The steering angle ratio controller 12 also has a variable power assisted steering drive section configured and arranged to control the steering angle ratio varying mechanism 5 with control commands for obtaining the target steering angle ratio.

The steering angle ratio changes smoothly in accordance with the steering angle, and a good steering sensation can be obtained because the steering angle ratio setting section of the steering angle ratio controller 12 gradually reduces the additional turning angular speed as the steering angle increases.

An increase in the steering reaction force due to power assist loss and other causes can be prevented because the steering angle ratio setting section of the steering angle ratio controller 12 maintains the additional turning angular speed to a value that is less than or equal to the value resulting from subtracting the minimum driver required steering speed from the maximum tolerated pinion (turning) angular speed determined by the linkage efficiency of the steering system and the capacity of the variable power assisted steering mechanism 6. Also, a reduction in the lock-to-lock can be assured without requiring an excessive increase in the capacity of the variable power assisted steering mechanism 6 by mounting a steering angle ratio varying mechanism 5.

Optimal steering gain corresponding to the vehicle speed can be set, and an increase in the steering reaction force due to power assist loss and other causes can be prevented because the steering angle ratio setting section sets the additional turning angular speed in accordance with maximum tolerated (turning) angular speed that changes in accordance with the vehicle speed.

The load of the variable power assisted steering mechanism 6 in the vicinity of the lock position that increases as the vehicle speed increases can be effectively reduced in accordance with the vehicle speed because the steering angle ratio setting section of the steering angle ratio controller 12 increases the additional turning angular speed in a steering angle range in the vicinity of the steering center point as the vehicle speed decreases.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle steering control system comprising:
a steering angle ratio varying mechanism configured and arranged to vary a steering angle ratio of a manually operated steering mechanism;
a variable power assisted steering mechanism configured and arranged to output an auxiliary steering force to the manually operated steering mechanism that supplements a driver steering force for turning steerable road wheels;

a steering angle detection device configured and arranged to detect a steering angle of the manually operated steering mechanism; and a steering angle ratio controller configured and arranged to control the steering angle ratio varying mechanism to increase the steering angle ratio in a center steering angle range in a vicinity of a center steering angle position, and to reduce the steering angle ratio in a steering angle range in a vicinity of a maximum steering limit position, regardless of a steering angular speed of the manually operated steering mechanism, the steering angle ratio controller being configured to set a target steering angle ratio and control the steering angle ratio varying mechanism to obtain the target steering angle ratio, and the steering angle ratio controller being further configured to set the target steering angle ratio to vary an additional turning angular speed, which is an additional amount of a turning angular speed produced by the steering angle ratio varying mechanism, such that the additional turning angular speed increases in the steering range in the vicinity of the center steering angle position, and decreases in the steering range in the vicinity of the maximum steering limit position.

2. The vehicle steering control system according to claim 1, wherein the steering angle ratio controller is further configured to set the target steering angle ratio to gradually decrease the additional turning angular speed as the steering angle increases.

3. The steering control system for a vehicle according to claim 2, wherein the steering angle ratio controller is further configured to maintain the additional turning angular speed to a value that is less than or equal to a value resulting from subtracting a minimum driver required steering speed from a maximum tolerated turning angular speed determined by a steering system linkage efficiency and the variable power assisted steering mechanism.

4. The steering control system for a vehicle according to claim 3, wherein the steering angle ratio controller is further configured to set the target steering angle ratio in accordance with the maximum tolerated turning angular speed that changes in accordance with vehicle speed.

5. The steering control system for a vehicle according to claim 4, wherein the steering angle ratio controller is further configured to increase the additional turning angular speed in the steering angle range in the vicinity of the steering center position with a reduction in the vehicle speed.

6. The steering control system for a vehicle according to claim 1, wherein the steering angle ratio controller is further configured to maintain the additional turning angular speed to a value that is less than or equal to a value resulting from subtracting a minimum driver required steering speed from a maximum tolerated turning angular speed determined by a steering system linkage efficiency and the variable power assisted steering mechanism.

7. The steering control system for a vehicle according to claim 6, wherein the steering angle ratio controller is further configured to set the target steering angle ratio in accordance with the maximum tolerated turning angular speed that changes in accordance with vehicle speed.

8. The steering control system for a vehicle according to claim 7, wherein the steering angle ratio controller is further configured to increase the additional turning angular speed in the steering angle range in the vicinity of the steering center position with a reduction in the vehicle speed.

9. A vehicle steering control system comprising:

steering angle ratio varying means for varying a steering angle ratio of a manually operated steering mechanism;

variable power assisted steering means for outputting an auxiliary steering force to the manually operated steering mechanism that supplements a driver steering force for turning steerable road wheels;

steering angle detection means for detecting a steering angle of the manually operated steering mechanism; and steering angle ratio control means for controlling the steering angle ratio varying means to increase the steering angle ratio in a center steering angle range in a vicinity of a center steering angle position, and to reduce the steering angle ratio in a steering angle range in a vicinity of a maximum steering limit position, regardless of a steering angular speed of the manually operated steering mechanism, the steering angle ratio control means further including a function for setting a target steering angle ratio and controlling the steering angle ratio varying means to obtain the target steering angle ratio, the steering angle ratio control means further including a function for setting the target steering angle ratio to vary an additional turning angular speed, which is an additional amount of a turning angular speed produced by the steering angle ratio varying means, such that the additional turning angular speed increases in the steering range in the vicinity of the center steering angle position, and decreases in the steering range in the vicinity of the maximum steering limit position.

10. A method of controlling a vehicle steering control system comprising:

varying a steering angle ratio of a manually operated steering mechanism;

selectively outputting an auxiliary steering force to the manually operated steering mechanism to supplement a driver steering force for turning steerable road wheels;

detecting a steering angle of the manually operated steering mechanism; and controlling the steering angle ratio to increase the steering angle ratio in a center steering angle range in a vicinity of a center steering angle position, and to reduce the steering angle ratio in a steering angle range in a vicinity of a maximum steering limit position, regardless of a steering angular speed of the manually operated steering mechanisms, the controlling of the steering angle ratio including setting a target steering angle ratio to vary an additional turning angular speed, which is an additional amount of a turning angular speed produced when the steering angle ratio of the manually operated steering mechanism is varied, such that the additional turning angular speed increases in the steering range in the vicinity of the center steering angle position, and decreases in the steering range in the vicinity of the maximum steering limit position.

* * * * *